United States Patent
Yamamoto et al.

(10) Patent No.: US 10,183,648 B2
(45) Date of Patent: Jan. 22, 2019

(54) WIRELESS AUTHENTICATION DEVICE FOR SADDLE-TYPE VEHICLE

(71) Applicant: KAWASAKI JUKOGYO KABUSHIKI KAISHA, Kobe-Shi, Hyogo (JP)

(72) Inventors: Tomo Yamamoto, Akashi (JP); Taro Iwamoto, Kakogawa (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 0 days.

(21) Appl. No.: 15/825,702

(22) Filed: Nov. 29, 2017

(65) Prior Publication Data
US 2018/0178754 A1 Jun. 28, 2018

(30) Foreign Application Priority Data
Dec. 28, 2016 (JP) .................. 2016-254985

(51) Int. Cl.
*B60R 25/04* (2013.01)
*B60R 25/24* (2013.01)
*G07C 9/00* (2006.01)

(52) U.S. Cl.
CPC .............. *B60R 25/04* (2013.01); *B60R 25/24* (2013.01); *G07C 9/00007* (2013.01); *G07C 9/00309* (2013.01); *B60R 2325/306* (2013.01); *G07C 2009/00769* (2013.01)

(58) Field of Classification Search
CPC ... B60R 25/04; B60R 25/24; B60R 2325/306; G07C 9/00007; G07C 9/00309; G07C 2009/00769
See application file for complete search history.

(56) References Cited

U.S. PATENT DOCUMENTS

| 6,861,947 | B2* | 3/2005 | Albert ................... | B60R 25/042 |
| | | | | 123/179.2 |
| 7,498,928 | B2* | 3/2009 | Konno .................... | B60R 25/24 |
| | | | | 340/426.15 |
| 7,656,278 | B2* | 2/2010 | Onishi .................... | B60R 25/04 |
| | | | | 340/426.12 |
| 8,040,225 | B2* | 10/2011 | Nakamura .............. | B60R 25/24 |
| | | | | 340/426.13 |

(Continued)

FOREIGN PATENT DOCUMENTS

JP 4481207 B2 6/2010

*Primary Examiner* — Brian E Miller
(74) *Attorney, Agent, or Firm* — Burr & Brown, PLLC

(57) ABSTRACT

A wireless authentication device includes a first operating input device, a locking mechanism, and a controller. The first operating input device receives an operation of a power engine to a startable state by being shifted from a first position to a second position. The locking mechanism switches between locked and unlocked states, the locked state being a state that restricts the shift of the first operating input device from the first position to the second position, and the unlocked state being a state that allows the first operating input device to shift from the first position to the second position. The controller determines whether the mobile terminal is lost through wireless communication with the mobile terminal, and if the power engine has stopped while the mobile terminal has been determined to have been lost, performs processing for keeping the locking mechanism in the unlocked state during a restartable period.

11 Claims, 4 Drawing Sheets

(56) References Cited

U.S. PATENT DOCUMENTS

| | | | | |
|---|---|---|---|---|
| 8,102,247 B2* | 1/2012 | Arakawa | ............... | B60R 25/33 |
| | | | | 340/426.1 |
| 8,232,870 B2* | 7/2012 | Yoshizawa | ............. | B60R 25/04 |
| | | | | 340/425.5 |
| 8,237,543 B2* | 8/2012 | Umeda | ................. | B60R 25/24 |
| | | | | 340/5.61 |
| 9,296,394 B2* | 3/2016 | Taoka | ............... | B60W 30/192 |
| 2002/0190843 A1* | 12/2002 | Konno | .................. | B62H 5/20 |
| | | | | 340/5.64 |
| 2003/0024754 A1* | 2/2003 | Konno | .................. | B60R 25/02 |
| | | | | 180/287 |
| 2004/0063477 A1* | 4/2004 | Konno | .................. | B60R 25/04 |
| | | | | 455/575.9 |
| 2004/0090307 A1* | 5/2004 | Konno | .................. | B60R 25/04 |
| | | | | 340/5.62 |
| 2005/0242929 A1* | 11/2005 | Onishi | .................. | B60R 25/04 |
| | | | | 340/426.17 |
| 2007/0214849 A1* | 9/2007 | Yoshitake | ............. | B60R 25/04 |
| | | | | 70/278.3 |
| 2016/0063843 A1* | 3/2016 | Karmel | ............... | G08B 21/182 |
| | | | | 340/686.6 |

* cited by examiner

WIRELESS AUTHENTICATION DEVICE FOR SADDLE-TYPE VEHICLE

BACKGROUND OF THE INVENTION

Field of the Invention

The present invention relates to a wireless authentication device for saddle-type vehicles, and in particular to a technique that enables the restart of a power engine even if a mobile terminal is lost and the power engine has stopped.

Description of the Background Art

Japanese Patent Publication No. 4481207 discloses a technique that enables the driver of a motorcycle to realize the loss of a transmitter during driving.

It is conceivable that the driver of a saddle-type vehicle such as a motorcycle may stop the power engine, not knowing the loss of a key, when getting off the motorcycle. Once the power engine is stopped, the driver is unable to drive the saddle-type vehicle. For this reason, it is preferable that, if the driver lost a key, a saddle-type vehicle remains restartable for some period of time after the power engine has stopped.

SUMMARY OF THE INVENTION

An object of the present invention is to, when a mobile terminal is lost, keep a saddle-type vehicle restartable after a power engine has stopped.

A wireless authentication device for a saddle-type vehicle according to an aspect performs authentication through wireless communication with a mobile terminal carried by a user. The wireless authentication device for a saddle-type vehicle includes a first operating input device, a locking mechanism, and a controller. The first operating input device receives an operation for switching a power engine to a startable state by being shifted from a first position to a second position. The locking mechanism switches between a locked state and an unlocked state, the locked state being a state that restricts shift of the first operating input device from the first position to the second position, and the unlocked state being a state that allows the first operating input device to shift from the first position to the second position. The controller determines whether a mobile terminal is lost through wireless communication with the mobile terminal, and if a power engine has stopped while the mobile terminal has been determined to have been lost, performs processing for keeping the locking mechanism in the unlocked state in a restartable period.

According to this wireless authentication device for a saddle-type vehicle, whether a mobile terminal is lost is determined through wireless communication with the mobile terminal, and if the power engine has stopped while the mobile terminal has been determined to have been lost through the wireless communication with the mobile terminal, the locking mechanism remains in the unlocked state so that the user is able to shift the first operating input device from the first position to the second position. Thus, even if the mobile terminal is lost, the user is able to restart the vehicle by shifting the first operating input device from the first position to the second position.

These and other objects, features, aspects and advantages of the present invention will become more apparent from the following detailed description of the present invention when taken in conjunction with the accompanying drawings.

DESCRIPTION OF THE PREFERRED EMBODIMENTS

A wireless authentication device for a saddle-type vehicle according to an embodiment will now be described hereinafter. The following embodiment describes an example in which the saddle-type vehicle is a motorcycle. The wireless authentication device according to the present invention is also applicable to other saddle-type vehicles different from motorcycles, such as all-terrain vehicles (ATVs) and personal watercrafts.

Figure 1:
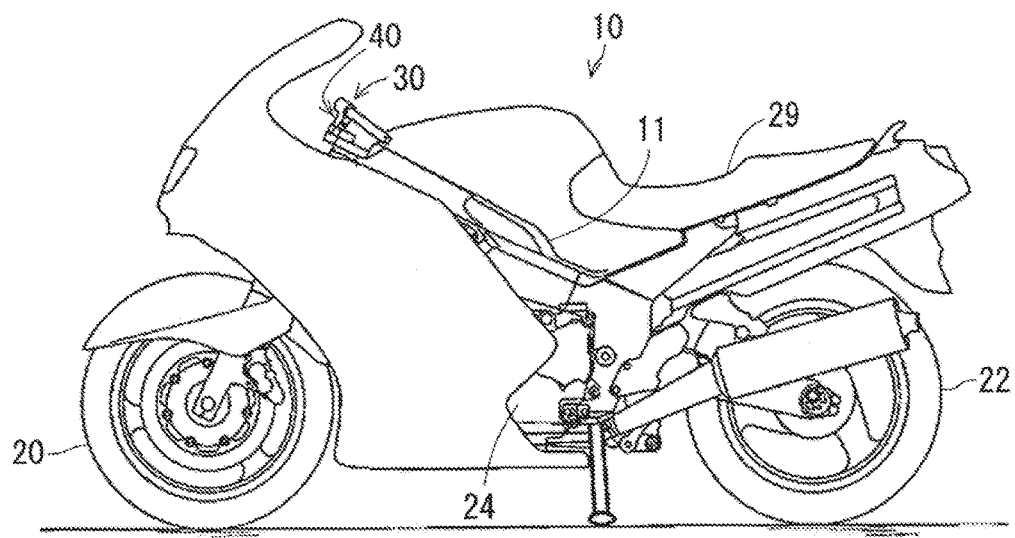
FIG. 1 is a side view of an overall configuration of a motorcycle.

For purposes of description, an overall configuration of the motorcycle will be described. FIG. 1 is a side view illustrating an overall configuration of a motorcycle 10. In the following description, up-and-down, back-and-forth, and right-and-left directions as referred to are defined as follows. First, one side of the motorcycle 10 on which a front wheel 20 and a rear wheel 22 contact the road surface is referred to as a downward direction, and the opposite side of the motorcycle 10 is referred to as an upward direction. A direction in which the motorcycle 10 travels is referred to as a forward direction, and the opposite direction is referred to as a backward direction. With the user as a driver on the motorcycle, the right and left sides with respect to the user are referred to as right and left sides of the motorcycle 10.

The motorcycle 10 is configured such that the front wheel 20 is rotatably mounted to the front side of a body frame 11, and the rear wheel 22 is rotatably mounted to the back side of the body frame 11. The body frame 11 is equipped with an engine 24, and the rear wheel 22 is rotationally driven by the engine 24. While the present embodiment describes an example in which the engine 24 serves as a power engine, the power engine may be other engines such as an electric motor. A handle device 40 is mounted to the front side of the body frame 11 and turned by the user to change the orientation of the front wheel 20 and thereby change the travel direction of the motorcycle 10. On the upper side of the body frame 11, a seat 29 is mounted on which the user as a driver sits.

Figure 2:
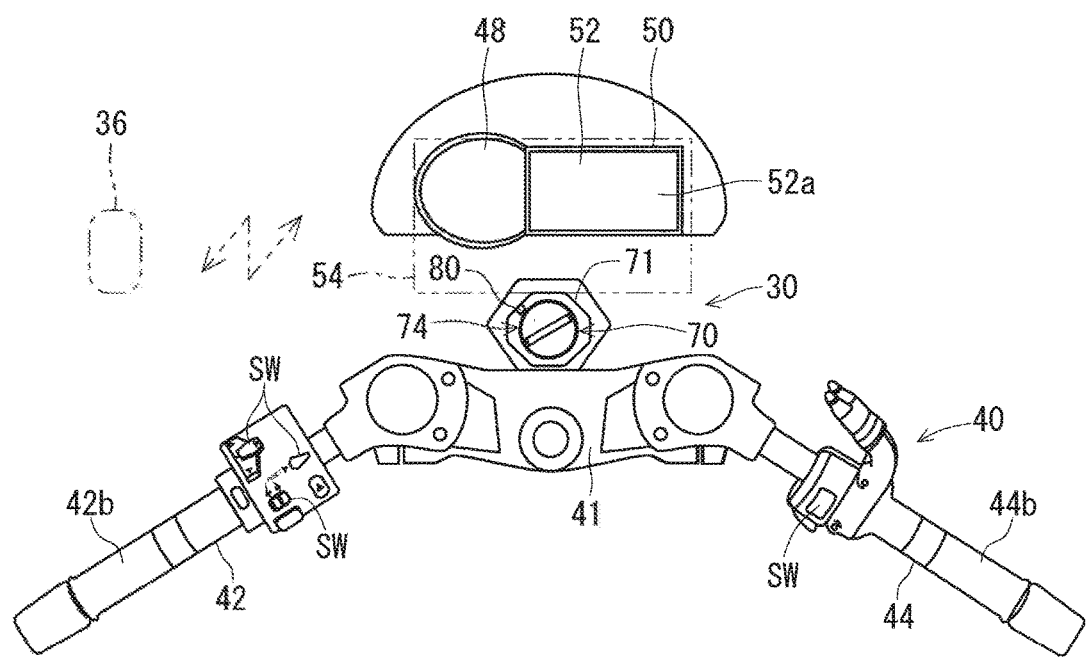
FIG. 2 is a descriptive diagram illustrating a configuration around a handle device and a meter unit of the motorcycle.

FIG. 2 is a descriptive diagram illustrating a configuration around the handle device 40 of the motorcycle 10.

The handle device 40 includes a left handlebar 42 and a right handlebar 44. The handle device 40 is supported via a bracket 41 or other means and provided so as to be capable of being turned along with a steering shaft that is rotatably supported on a head pipe mounted to the front side of the body frame 11.

The left handlebar 42 is equipped with a handle grip 42b. The user drives the motorcycle while grasping the handle grip 42b. The left handlebar 42 is also provided with switches SW that are disposed inward of the handle grip 42b in the direction of the vehicle width and that enable the user to input various instructions.

The right handlebar 44 is equipped with a handle grip 44b. The user drives the motorcycle while grasping the handle grip 44b.

A meter unit 50 is provided in a position ahead of the handle device 40. The meter unit 50 includes a tachometer 48 and a display 52. The tachometer 48 indicates the number of revolutions of the engine 24, and the display 52 displays various types of information such as vehicle speed and residual fuel, i.e., provides various types of information to the user.

A start switch unit 70 is provided in a position between the left handlebar 42 and the right handlebar 44 and behind the meter unit 50. The start switch unit 70 may be provided at other places such as in the meter unit. The start switch unit 70 receives operations from the user when the engine 24 is started.

The motorcycle 10 includes an authentication electronic controller (ECU) 54 that receives operations from the user via the start switch unit 70 and performs processing such as authentication through wireless communication with a mobile terminal 36 carried by the user. While the authentication ECU 54 illustrated in FIG. 2 is located below the meter unit 50, the authentication ECU 54 may be located at any other position.

A wireless authentication device 30 is incorporated into a vehicle such as the motorcycle described above and performs authentication through wireless communication with the mobile terminal 36 carried by the user. The wireless authentication device 30 includes a first operating input device, a locking mechanism, and a controller. The first operating input device receives an operation for switching the engine 24, which is one example of a power engine, to a startable state by being shifted from a first position to a second position. The locking mechanism is configured to be capable of switching between a locked state and an unlocked state, the locked state being a state that restricts the shift of the first operating input device from the first position to the second position, and the unlocked state being a state that allows the first operating input device to shift from the first position to the second position. The controller is configured to be capable of determining whether the mobile terminal is lost through wireless communication with the mobile terminal and, if the engine 24 has stopped while the mobile terminal has been determined to have been lost, performing first processing for keeping the locking mechanism in the unlocked state in a restartable period.

One example of the first operating input device is a combination of an operation part 74 and a rotation detector 76 of the start switch unit 70, which will be described later, one example of the locking mechanism is a solenoid actuator 82, and one example of the controller is the authentication ECU 54. Each constituent input device will be described in more detail hereinafter.

Figure 3:
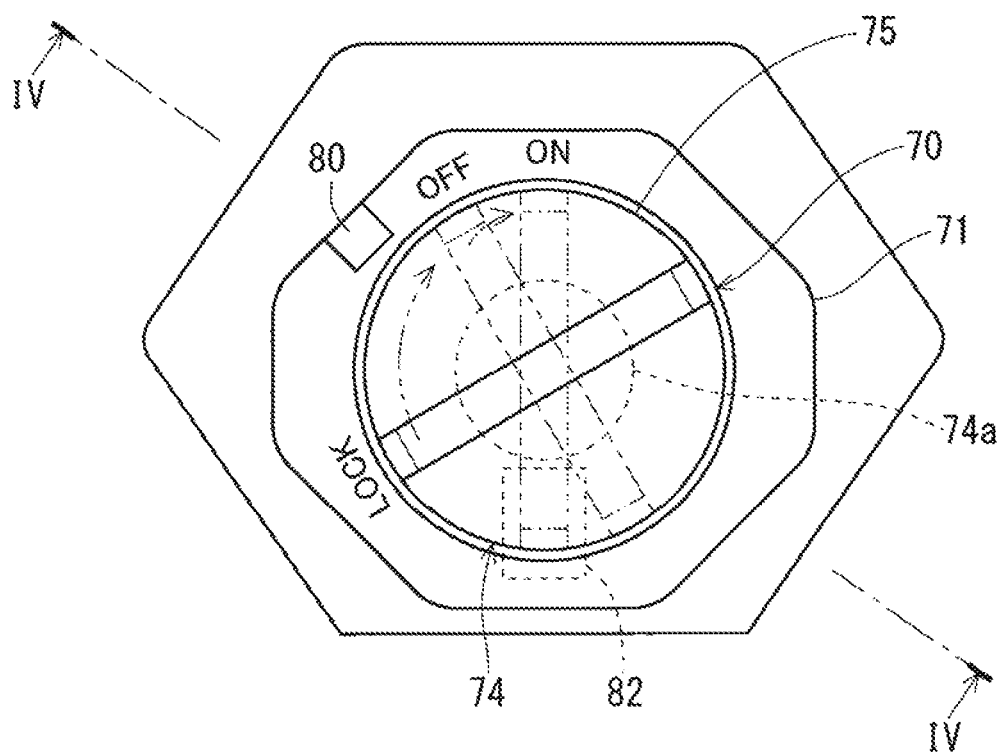
FIG. 3 is a schematic plan view of a start switch unit.

FIG. 3 is a schematic plan view of the start switch unit 70.

Figure 4:
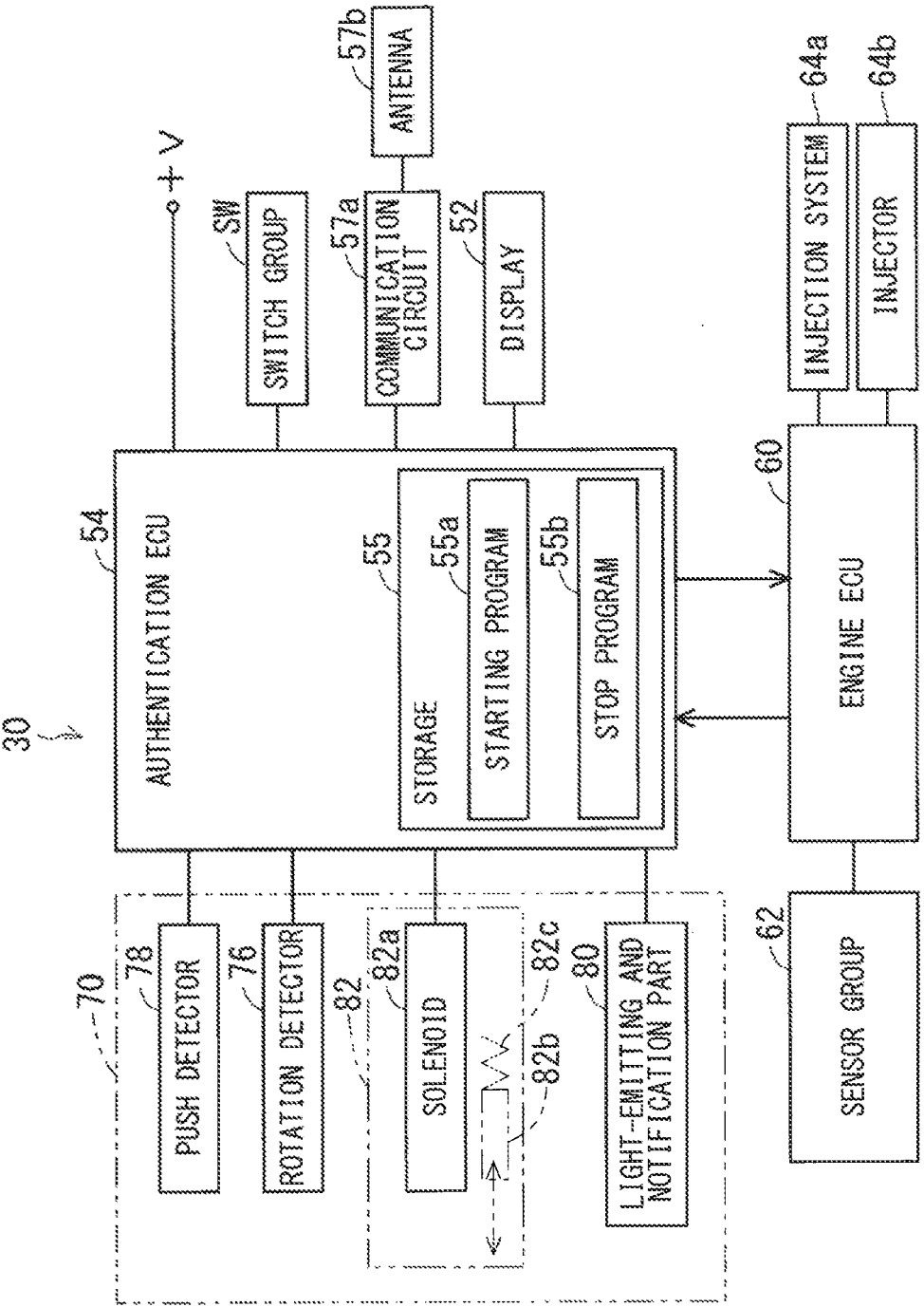
FIG. 4 is a block diagram illustrating an electrical configuration of the motorcycle.

The start switch unit 70 includes the operation part 74, the rotation detector 76, and a push detector 78 (see FIG. 4 for the rotation detector 76 and the push detector 78).

The operation part 74 is configured to have a knob 75 at one end of a shaft part 74a. An outward portion of the knob 75 has a long narrow projection that enables the user to easily hold the knob 75 between fingers and rotationally operate the knob 75. This operation part 74 is supported so as to be capable of being rotated relative to a switch base 71 and being pushed and moved in a direction parallel to the axis of rotation, while the knob 75 is exposed to the outside. More specifically, the user is able to operate the operation part 74 with fingers so as to push the operation part 74 toward the switch base 71 along the axis of rotation. The user is also able to rotate the knob 75 about the axis of rotation by holding the knob 75 between fingers.

The switch base 71 is supported in a fixed position relative to a vehicle front portion of the upper bracket 41 and supported so as to be turned along with the handle device 40 supported by the upper bracket 41. As another example, the switch base 71 may be supported in a fixed position relative to other members such as an exterior member or the body frame 11.

An outward portion of the switch base 71 has characters such as "LOCK," "OFF," and "ON" written thereon as marks that indicate the rotational position of the operation part 74.

The rotation detector 76 is configured by a rotary switch. When the user has rotated the operation part 74 by rotationally operating the knob 75, the rotation detector 76 detects this rotation and outputs an operation signal that depends on the detection result.

In the present example, the user is able to rotationally operate the operation part 74 from a rotational position indicating "LOCK" described above through a rotational position indicating "OFF" to a rotational position indicating "ON" and vice versa by holding the knob 75 between fingers and operating the knob 75. The rotation detector 76 is configured to be capable of outputting a LOCK signal, an OFF signal, or an ON signal that depends on the rotational position of the knob 75. In the present example, when the knob 75 is rotated to the rotational position indicating "ON," the rotation detector 76 outputs an ON signal to the authentication ECU 54, the ON signal being a signal for instructing the authentication ECU 54 to make the engine startable, and the authentication ECU 54 switches the engine 24, which is one example of a power engine, to a startable state. That is, assuming that the above-described state in which the knob 75 is at the rotational position indicating "LOCK" is defined as a first position and a state in which the knob 75 is at the rotational position indicating ON" is defined as a second position, the knob 75 receives an operation for switching the engine 24, which is one example of a power engine, to a startable state by being shifted from the first position to the second position. When the engine 24 has been switched to a startable state, the user becomes able to press a self starter switch SW1 to rotate a self starter motor and thereby start the engine 24. With the engine 24 started, the knob 75 is kept at the second position.

When the knob 75 is rotated to the position indicating "OFF" during rotation from the first position to the second position, the power to the vehicle is turned on and handles or other parts are unlocked, while the engine 24 remains in a non-startable state. When the knob 75 is further rotated from this state, the engine 24 is switched to a startable state as described above while the power to the vehicle remains on and handles or other parts remain unlocked.

The push detector 78 is configured by a switch that is capable of detecting the push and shift of the operation part 74. When the user has pushed the knob 75 and shifted the operation part 74 in the direction of the push, the push detector 78 detects this shift in the direction of the push and outputs an operation signal that depends on the detection result. In the present example, when the user has pushed the operation part 74, the push detector 78 outputs an authentication start signal to the authentication ECU 54. Thus, the push detector 78 is one example of a second operating input device that is capable of receiving an authentication start operation and, in particular, one example of a shift operating input device that receives an operation for shifting the operation part 74, which is part of one example of the first operating input device.

The start switch unit 70 described above includes a light-emitting and notification part 80 and the solenoid actuator 82.

The light-emitting and notification part 80 is configured by a device such as a light emitting diode, an organic electroluminescent (EL) light-emitting device, or an incandescent lamp. The light-emitting and notification part 80 is preferably a device such as a light emitting diode or an organic EL light-emitting device. This is because a device such as a light emitting diode or an organic EL light-emitting device has lower power consumption than other light emitting parts. This light-emitting and notification part 80 is one example of a notification display part that is provided in the switch base 71, which is a portion surrounding the knob 75 described above, so as to enable the user to visually identify the light emitting state of the light-emitting and notification part 80 from the front side of the switch base 71. The light-emitting and notification part may be provided in other parts such as the knob.

The solenoid actuator 82 is configured to be capable of imposing or removing restrictions on the rotation of the operation part 74 relative to the switch base 71. The solenoid actuator 82 may adopt a configuration that includes, for example, a solenoid 82a, a locking part 82b, and a biasing part 82c such as a coil spring (see FIG. 4 for the solenoid 82a, the locking part 82b, and the biasing part 82c). The locking part 82b is configured by an iron magnetic material and disposed so as to be movable toward and away from the shaft part 74a. When having moved toward the shaft part 74a and positioned at a locked position, the locking part 82b fits in a restriction recess formed in the shaft part 74a to restrict the rotation of the operation part 74 from the first position to the second position. When having moved away from the shaft part 74a and positioned at an unlocked position, the locking part 82b allows the operation part 74 to rotate and move from the first position to the second position. The biasing part 82c may be a coil spring and always biases the locking part 82b in the direction toward the shaft part 74a. The solenoid 82a is one example of a driving source that drives and moves the locking part 82b from the locked position to the unlocked position. More specifically, the solenoid 82a is driven and controlled to switch between excited and non-excited states by the authentication ECU 54. In the excited state, the solenoid 82a attracts the locking part 82b in the direction of retraction. Thus, in the non-excited state of the solenoid 82a, the locking part 82 is moved to the locked position by the biasing force of the biasing part 82c and switched to a state that restricts the rotation and movement of the operation part 74, thus making it difficult for the user to rotate the knob 75 even if the user tries to by holding the knob 75 between fingers. In the excited state of the solenoid 82a, the magnetic force of the solenoid 82a causes the locking part 82b to move in the direction of retraction against the biasing force of the biasing part 82c, and accordingly, the user is able to easily rotate the operation part 74 to the first position by holding the knob 75 between fingers.

The solenoid actuator 82 may also be configured such that, even if the locking part 82b restricts the rotation of the operation part 74, a torque limiter is built into the switch base 71, and when the knob 75 is operated by a force greater than a predetermined level, the operation part 74 turns free without rotating equally relative to the switch base 71 in order to prevent the operation part 74 from becoming damaged.

It is not an absolute necessity to use the solenoid actuator 82 as a switching mechanism for imposing or removing restrictions on the rotation of the operation part 74 as described above, and other configurations different from the above configuration may be adopted, such as a configuration for changing the posture or position of a rotation restriction piece by driving an electric motor or other means.

FIG. 4 is a block diagram illustrating an electrical configuration of the motorcycle 10. The motorcycle 10 includes the authentication ECU 54 and an engine ECU 60.

The authentication ECU 54 is configured by a typical microcomputer that includes, for example, a CPU (processor), a ROM, and a RAM and performs every arithmetic operation via software programs stored in advance. The authentication ECU 54 stores programs such as a starting program 55a and a stop program 55b in a storage 55 that is configured by a rewritable flash memory or the like. This authentication ECU 54 performs processing that will be described later in accordance with a processing procedure described in the starting program 55a or the stop program 55b.

The authentication ECU 54 is provided with a function of a controller that performs the first processing by performing authentication through wireless communication with the mobile terminal 36 carried by a user. The first processing includes processing for determining whether the mobile terminal 36 is lost, through the wireless communication with the mobile terminal 36. The first processing further includes processing for, when the engine has stopped while the mobile terminal 36 has been determined to have been lost, keeping the solenoid actuator 82 in the unlocked state in the restartable period. According to the present embodiment, the authentication ECU 54 is also provided with other functions used in an ordinary power-engine stopped state, such as a function of performing authentication through wireless communication with the mobile terminal 36 and performing various types of processing until the engine 24 is started, a function of receiving various inputs from the group of switches SW including the self starter switch SW1, and a function of controlling the display content of the display 52.

Like the authentication ECU 54, the engine ECU 60 is also configured by a typical microcomputer and performs various types of control while establishing bi-directional communication, such as CAN communication, with the authentication ECU 54.

The function of the authentication ECU 54 performing the above-described first processing may be implemented by other ECUs different from the ECU that performs, in the ordinary power-engine stopped state, the function of performing various types of processing until the engine 24 is started, the function of receiving various inputs from the group of switches SW, and the function of controlling the display content of the display 52, or may be implemented as one function of the engine ECU 60.

The authentication ECU 54 is connected to the rotation detector 76, the push detector 78, the solenoid actuator 82, the light-emitting and notification part 80, and the display 52, which are constituent elements of the start switch unit 70. When the user has rotated the operation part 74 by holding the knob 75 between fingers, the rotation detector 76 inputs a signal that indicates the rotational position of the operation part 74, to the authentication ECU 54. When the user has pushed the knob 75 and shifted the operation part 74 in the direction of the push, the push detector 78 inputs a signal (authentication start signal) that indicates the push of the operation part 74 to the authentication ECU 54. The solenoid actuator 82 and the light-emitting and notification part 80 operate when driven and controlled by the authentication ECU 54.

The authentication ECU 54 is also connected to a power source, the group of switches SW including the self starter switch SW1, and the display 52. The authentication ECU 54 is also connected to an antenna 57*b* via a wireless communication circuit 57*a*. The authentication ECU 54 operates with the supply of power from the power source, performs operations such as receiving various instructions from the group of switches SW, and performs display control of the display 52. The authentication ECU 54 further performs wireless communication with the mobile terminal 36 via the wireless communication circuit 57*a* and the antenna 57*b*.

The engine ECU 60 is connected to, for example, an ignition system 64*a* and an injector 64*b* that are mounted to the motorcycle 10, and performs control relating primarily to the engine 24.

The authentication ECU 54 and the engine ECU 60 perform, for example, control of the engine 24 in cooperation with each other on the basis of various instructions from the group of switches SW and various outputs from a sensor group 62.

The mobile terminal 36 includes a key-side ECU, a wireless communication circuit, and an antenna.

Like the authentication ECU 54, the key-side ECU is configured by a typical microcomputer and operates with the supply of power from a battery built into the mobile terminal 36. The key-side ECU includes a storage configured by a rewritable flash memory. The storage stores a key-side authentication program. The key-side ECU performs processing relating to authentication in accordance with a procedure described in the key-side authentication program through wireless communication with the authentication ECU 54 via the wireless communication circuit and the antenna.

The authentication ECU 54 has a function of performing authentication through wireless communication with the mobile terminal 36 and performing the following processing.

First, upon receiving an operation to the second operating input device in the ordinary power-engine stopped state, the authentication ECU 54 determines whether authentication has succeeded through wireless communication with the mobile terminal 36, and if the authentication has succeeded, perform processing for switching the solenoid actuator 82, which is a locking mechanism, to the unlocked state.

In the present example, when an authentication start operation has been received via the second operating input device, the authentication ECU 54 determines whether the authentication has succeeded through wireless communication with the mobile terminal 36. Since the push detector 78 is provided as the second operating input device in the present example, the authentication ECU 54 receives an authentication start operation when the user has pushed the knob 75 of the operation part 74.

When the authentication has been determined to have succeeded, the authentication ECU 54 turns on the solenoid 82*a* and switches the solenoid 82*a* to the excited state. This causes the locking part 82*b* to move in the direction of retraction and switch to the unlocked state that enables the user to rotate the operation part 74. In this state, the user is able to rotate and shift the operation part 74 from the first position to the second position by holding the knob 75 between fingers. When the operation part 74 has been shifted from the first position to the second position, the rotation detector 76 outputs a signal that depends on the shift of the operation part 74, to the authentication ECU 54. Upon receipt of this signal, the authentication ECU 54 outputs a signal that enables the startup of the engine 24, to the engine ECU 60. If the user has operated the self starter switch SW1 in this state, the engine 24 is started under the control of the engine ECU 60.

When the authentication has succeeded, the authentication ECU 54 may cause the light-emitting and notification part 80 to perform a light-emitting and notification operation. In this case, the user is able to recognize that the authentication has succeeded by seeing the light emission from the light-emitting and notification part 80.

The authentication ECU 54 also determines whether the mobile terminal 36 is lost, through the wireless communication with the mobile terminal 36, and if the engine 24 has stopped while the mobile terminal 36 has been determined to have been lost, performs the first processing for keeping the solenoid actuator 82 in the unlocked state in the restartable period. Thus, the user is able to restart the engine by rotating the knob 75 from the first position to the second position in the restartable period, even if the user who lost the mobile terminal 36 has stopped the engine 24 by, for example, rotating the knob 75 from the second position to the first position.

In the present example, the first processing performed by the authentication ECU 54 includes return-to-unlocked-state processing in which the solenoid 82*a* serving as a driving source is set in a non-driving state during at least part of the restartable period, and when an operation to the second operating input device has been received, the solenoid 82*a* is driven to move the locking part 82*b* to the unlocked position against the biasing force of the biasing part 82 and switch the solenoid actuator 82 to the unlocked state.

Thus, even if the user who lost the mobile terminal 36 has stopped the engine 24 by, for example, rotating the knob 75 from the second position to the first position, the user is able to switch the solenoid actuator 82 to the unlocked state by pushing the knob 75. Accordingly, the user is able to make the engine restartable by rotating the knob 75 from the first position to the second position and then to restart the engine by operating the self starter switch SW1. At this time, the solenoid 82*a* remains in the non-driving state (in the non-excited state that does not conduct electricity) until the user pushes the knob 75. This avoids a situation where the solenoid 82*a* continues to be excited for a long period of time.

In the present example, the first processing performed by the authentication ECU 54 also includes unlocked-state continuation processing for continuing to drive the solenoid 82*a* during the initial period of the restartable period. The above-described return-to-unlocked-state processing is performed after the period of the unlocked-state continuation processing.

Thus, in the initial period of the restartable period, the user is able to make the engine restartable by rotating the knob 75 from the first position to the second position without pushing the knob 75 and then to restart the engine by operating the self starter switch SW1, even after the user who lost the mobile terminal 36 has stopped the engine 24 by, for example, rotating the knob 75 from the second position to the first position.

In the case where the return-to-unlocked-state processing is performed after the unlocked-state continuation processing as the first processing, the relationship between the state of receipt of operation to the start switch unit 70 and the state of the solenoid actuator 82 is as follows.

The restartable period continues, starting from the time when an operation for stopping the engine (engine stop operation) has been performed or when the engine 24 has stopped while the mobile terminal 36 has been determined to have been lost. The initial period of the restartable period is an unlocked-state continuation processing period for performing the unlocked-state continuation processing, and the subsequent period is a return-to-unlocked-state processing period for performing the return-to-unlocked-state processing.

During the unlocked-state continuation processing period, the solenoid 82a is in the ON state, in which the user is able to make the engine restartable by rotating the knob 75 from the first position to the second position.

During the return-to-unlocked-state processing period, the solenoid 82a is in the OFF state, in which the user is able to switch the solenoid actuator 82 to the unlocked state by pushing the knob 75 and then to make the engine restartable by rotating the knob 75 from the first position to the second position.

After the above restartable period has elapsed, the solenoid 82a transitions to a normal OFF state in which the solenoid actuator 82 is kept in the locked state. In this state, the user who does not carry the mobile terminal 36 is unable to rotate the knob 75 even if pushing the knob 75, and accordingly unable to make the engine restartable.

The authentication ECU 54 also has a function of notifying the user of the loss of the mobile terminal 36 via a notification part when the engine 24 has stopped while the mobile terminal 36 has been determined to have been lost.

The notification part may be the display 52 that displays a screen for notifying the user of the loss of the mobile terminal 36.

In the present example, a screen that displays information notifying the user of the loss of the mobile terminal, the amount of time for which the engine 24 is restartable, and information about a restart method is displayed when the engine 24 has stopped while the mobile terminal 36 has been determined to have been lost.

One example of such a restart guide screen that is displayed during the unlocked-state continuation processing period is as follows. A warning image is displayed on the upper left of the screen, and a lost key image that indicates the loss of the mobile terminal is displayed on the upper right of the screen. The warning image may be an image that includes an exclamation mark. The lost key image may be an image obtained by overlaying "X" on the image of a key. These images notify the user of the loss of the mobile terminal 36. Moreover, a guide image is displayed on the lower side of the restart guide screen. The guide image includes an image that is displayed on the upper side to indicate the amount of time for which the engine 24 is restartable by the return-to-unlocked-state processing (e.g., a message saying "TURN ON KEY IN 5 s"; the numerical value is successively counted down), and an image that is displayed on the lower side to indicate that the knob 75 be rotated, as restart information indicating a restart method. Thus, the user is able to know the loss of the mobile terminal 36, an available amount of time for restart, and the restart method by seeing the restart guide screen and thereby to restart the engine 24.

One example of the restart guide screen that is displayed during the return-to-unlocked-state processing period is as follows. The restart guide screen displays, as described above, a warning image on the upper left and a lost key image that indicates the loss of the mobile terminal 36 on the upper right. A guide image is also displayed on the lower side of the restart guide screen. The guide image includes an image that is displayed on the upper side to indicate the amount of time for which the engine 24 is restartable by the return-to-unlocked-state processing (e.g., a message saying "PUSH AND TURN ON KEY IN 25 s"; the numerical value is successively counted down), and an image that is displayed on the lower side to indicate that the knob 75 be pushed and rotated, as restart information indicating a restart method. Thus, the user is able to know the loss of the mobile terminal 36, an available amount of time for restart, and the restart method by seeing the restart guide screen and thereby to restart the engine 24.

Alternatively, a common restart guide screen may be displayed during both of the unlocked-state continuation processing period and the return-to-unlocked-state processing period. As another alternative, the restart guide screen may display at least a screen that notifies the user of the loss of the mobile terminal 36. Even in the case where the restart guide screen includes information about the amount of time for which the engine 24 is restartable and information about the restart method, it is not an absolute necessity to include both pieces of information, and the restart guide screen may include only either one of the pieces of information.

In normal driving of the motorcycle 10, driving information such as speed is largely displayed on a display screen 52a of the display 52. The restart guide screen displays an image that is information notifying the user of the loss of the mobile terminal 36, in the area where the driving information is displayed.

When the mobile terminal 36 has been determined not to have been lost, the display screen 52a displays a normal end screen as a first screen. For example, the normal end screen displays a message saying "SEE YOU". The normal end screen may display other information. In contrast, the above-described restart guide screen that is a second screen is different from the normal end screen. For example, the normal end screen merely displays information that notifies the user of normal end. In contrast, the restart guide screen displays, for example, information that notifies the user of the loss of the key and information about the restart method, instead of displaying information that notifies the user of normal end. Thus, the above-described restart guide screen, which is the second screen, is apparently different in content and design of displayed information from the normal end screen. Thus, the user is able to easily notice the display of the restart guide screen different from the ordinary normal end screen.

Since the restart guide screen different from the normal end screen is displayed on the display 52 when the engine 24 has stopped while the mobile terminal 36 has been determined to have been lost, the user is able to easily notice the loss of the mobile terminal 36.

Figure 5:
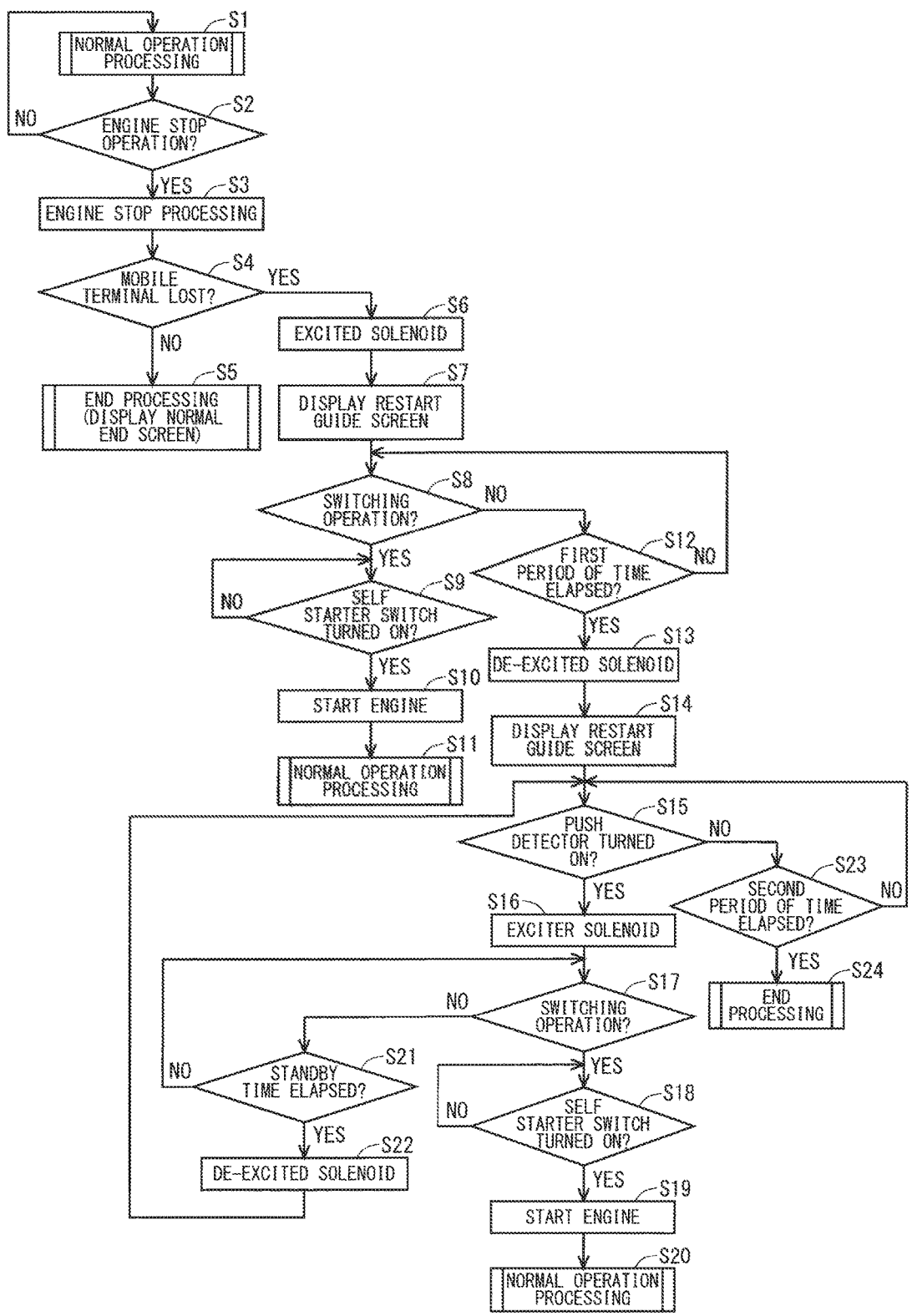
FIG. 5 is a flowchart showing an example of processing performed by an authentication ECU when an engine has stopped.

An exemplary flowchart of the above-described processing performed by the authentication ECU 54 will now be described with reference to FIG. 5. The flowchart described herein is merely one example, and does not intend to limit the processing performed by the authentication ECU 54 to the processing described below.

In normal operation processing in step S1, the authentication ECU 54 determines whether an engine stop operation has been performed in step S2, and if the engine stop operation has been determined to have been performed, the procedure proceeds to step S3. The engine stop operation may be implemented by, for example, the user rotating the knob 75 from the second position toward the first position, i.e., to the position indicating "LOCK" or rotating the knob 75 to the position indicating "OFF" (i.e., first position).

In step S3, the authentication ECU 54 performs engine stop processing. The engine stop processing is processing for issuing a command to stop the engine 24 to the engine ECU 60. The engine ECU 60 stops the engine 24 in response to this command.

Next, in step S4, the authentication ECU 54 determines whether the mobile terminal 36 is lost. Whether the mobile terminal 36 is lost may be determined, for example, in such a manner that processing for regularly establishing wireless communication between the authentication ECU 54 and the mobile terminal 36 and determining whether authentication has succeeded is performed in the normal driving operation processing, and whether authentication that is performed through wireless communication established just before the execution of the engine stop operation has succeeded is used as a criterion of determination. If the authentication at that time has succeeded, the mobile terminal 36 is determined not to have been lost, whereas if the authentication has failed, the mobile terminal 36 is determined to have been lost. Alternatively, when the engine stop operation has been performed, the authentication ECU 54 and the mobile terminal 36 may establish wireless communication therebetween to determine whether authentication has succeeded and to determine whether the mobile terminal 36 is lost. If the mobile terminal 36 has been determined not to have been lost in step S4, the procedure proceeds to step S5.

In step S5, normal end processing is performed. When the normal processing has been performed, the display 52 displays, for example, the normal end screen.

If the mobile terminal 36 has been determined to have been lost in step S4, the procedure proceeds to step S6

In step S6, the authentication ECU 54 switches the solenoid 82a to the excited state (driving state) and keeps the solenoid 82a in that excited state. Accordingly, the locking part 82b is moved to the unlocked position, and the operation part 74 including the knob 75 is kept in the unlocked state and kept rotatable toward the second position. In this state, the user is able to rotate the operation part 74 from the first position to the second position by operating the knob 75.

Next, in step S7, the authentication ECU 54 displays the restart guide screen on the display screen 52a. The restart guide screen may, for example, be the restart guide screen that is displayed during the return-to-unlocked-state processing period as described above. The user is able to know, for example, the loss of the mobile terminal 36, a subsequently necessary method for restarting the engine 24, and the amount of time for which the engine 24 is restartable by seeing this restart guide screen. Note that step S7 may be performed before step S6.

Next, in step S8, the authentication ECU 54 determines whether an operation for switching the knob 75 to the second position has been performed. If the switching operation has been determined to have been performed, the procedure proceeds to step S9, and the engine 24 becomes restartable if an input to the self starter switch SW1 is received. The solenoid 82a may be switched to the non-excited state when the knob 75 has been determined to have been switched.

In step S9, it is determined whether the self starter switch SW1 has been turned on. If the self starter switch SW has been determined to have been turned on, the procedure proceeds to step S10.

In step S10, the authentication ECU 54 issues a command to start the engine 24 to the engine ECU 60, and the engine 24 is restarted to enable the normal operation processing as illustrated in step S11.

If the switching operation has been determined not to have been performed in step S8, the procedure proceeds to step S12. In step S12, it is determined whether a predetermined first period of time t1 has elapsed. The first period of time t1 may be a period of time that is timed starting from when the engine stop operation has been performed or when the engine 24 has stopped, and may be five seconds, for example. If the first period of time t1 has been determined not to have elapsed yet, the procedure returns to step S8, whereas if the first period of time t1 has been determined to have elapsed, the procedure proceeds to step S13. If the timed period of time is the same as the first period of time t1, the procedure may either return to step SB or proceed to step S13. That is, the procedure may proceed to step S13 in either case where the timed period of time is greater than or equal to the first period of time t1 or where the timed period of time exceeds the first period of time t1.

In step S13, the authentication ECU 54 switches the solenoid 82a to the non-excited state (non-driving state). Accordingly, the locking part 82b is moved to the locked position by the biasing force of the biasing part 82c, and the operation part 74 including the knob 75 is kept in the locked state.

Next, in step S14, the authentication ECU 54 displays the restart guide screen on the display screen 52a. The restart guide screen may, for example, be the restart guide screen that is displayed during the return-to-unlocked-state processing period as described above. The user is able to know the loss of the mobile terminal 36, a subsequently necessary method for restarting the engine 24, and the amount of time for which the engine 24 is restartable by seeing this restart guide screen.

Next, in step S15, the authentication ECU 54 determines whether the push detector 78 has been turned on. If the push detector 78 has been determined not to have been turned on, the procedure proceeds to step S23.

In step S23, the authentication ECU 54 determines whether a second period of time t2 has elapsed. The second period of time t2 may be timed starting from when the engine stop operation has been performed or when the engine has stopped. The second period of time t2 may be 35 seconds, for example. Note that the second period of time t2 may be timed with reference to the other time such as the finish time of the first period of time t1. If the second period of time t2 has been determined not to have elapsed yet, the procedure returns to step S15, whereas if the second period of time t2 has been determined to have elapsed, the procedure proceeds to step S24. If the timed period of time is the same as the second period of time t2, the procedure may either return to step S15 or proceed to step S24. That is, the procedure may proceed to step S24 in either case where the timed period of time is greater than or equal to the second period of time t2 or where the time period of time exceeds the second period of time t2.

In step S24, the authentication ECU 54 performs end processing. For example, the authentication ECU 54 may issue a command to cause the engine 24 to transition to a sleep state or a power-off state, and the authentication ECU 54 itself may transition to a power-on state or a sleep state.

If the user has pushed the knob 75 in step S15, it is determined that the push detector 78 has turned on, and the procedure proceeds to step S16.

In step S16, the authentication ECU 54 switches the solenoid 82a to the excited state (driven state) and keeps the solenoid 82a in that excited state. Accordingly, the locking part 82b is moved to the unlocked position, and the operation part 74 including the knob 75 is kept in the unlocked state and kept rotatable toward the second position. Thus, the user is able to rotate the operation part 74 by holding the knob 75 between fingers.

Next, in step S17, the authentication ECU 54 determines whether an operation for switching the knob 75 toward the second position has been performed. If the switching operation has been determined not to have been performed, the procedure proceeds to step S21.

In step S21, it is determined whether a predetermined standby time has elapsed. The standby time may be a period of time that is timed starting from the start time when the solenoid 82a is excited. The standby time may be five seconds, for example. If the standby time has been determined not to have elapsed, the procedure returns to step S17, whereas if the standby time has been determined to have elapsed, the procedure proceeds to step S22, in which the solenoid 82a is switched to the non-excited state and the procedure returns to step S15. If the timed period of time is the same as the standby time, the procedure may proceed to either step S17 or step S22. That is, the procedure may proceed to step S22 in either case where the timed period of time is greater than or equal to the standby time or where the timed period of time exceeds the standby time.

If the user has rotated the operation part 74 by holding the knob 75 between fingers in step S17, the switching operation has been determined to have been performed, and the procedure proceeds to step S18, in which the engine 24 becomes restartable if an input to the self starter switch SW1 is received. The solenoid 82a may be switched to the non-excited state when the switching operation has been determined to have been performed in step S17.

In step S18, it is determined whether the self starter switch SW1 has been turned on. If the user has turned on the self starter switch SW1, the self starter switch SW1 has been determined to have been turned on, and the procedure proceeds to step S19.

In step S19, the authentication ECU 54 issues a command to start the engine 24 to the engine ECU 60, and the engine 24 is restarted to enable normal operation processing as illustrated in step S20.

With the wireless authentication device 30 having this configuration, the authentication ECU 54 determines whether the mobile terminal 36 is lost, through wireless communication with the mobile terminal 36, and if the engine 24 has stopped while the mobile terminal 36 has been determined to have been lost, the authentication ECU 54 keeps the solenoid actuator 82 in the unlocked state to allow the knob 75 of the operation part 74 to shift from the first position to the second position. Thus, even if the mobile terminal 36 is lost, the user is able to make the engine 24 restartable and make the vehicle drivable by shifting the knob 75 of the operation part 74 from the first position to the second position.

During the return-to-unlocked-state processing period that is at least part of the restartable period during which the engine 24 is restartable, the solenoid 82a is kept in the non-excited state, and if an operation for pushing the knob 75 of the operation part 74 has been received, the solenoid 82a is switched to the excited state and the locking part 82b is moved to the unlocked position against the biasing force of the biasing part 82c to switch the solenoid actuator 82 to the unlocked state. Since the solenoid 82a is once switched to the non-energized state in which the solenoid 82a is not excited, it is possible to avoid a situation where the solenoid 82a remains in the excited state for a long period of time. This configuration minimizes the load on the solenoid 82a.

The push detector 78 is configured to receive the shift of the operation part 74 caused by a user operation. Thus, after the user has pushed the knob 75 of the operation part 74 and this shift has been received by the push detector 78, the user is able to easily start the engine 24 by rotating the knob 75 of the operation part 74 from the first position to the second position.

In cases such as where the engine 24 is normally stopped or where the user restarts the engine 24 while the mobile terminal 36 is lost, if an operation to the push detector 78 has been received, the solenoid actuator 82 is switched to the unlocked state and it becomes possible to restart the engine 24 by similar operations.

In the early period of the unlocked-state continuation processing period after the engine 24 has stopped while the mobile terminal 36 is lost, the user is able to restart the engine 24 by a simple operation, i.e., by simply rotating the knob 75 of the operation part 74 without any shift operation to the push detector 78. In the initial period of the power-engine restartable period after the engine 24 has stopped, the solenoid 82a continues to be excited, and thereafter the return-to-unlocked-state processing is performed to switch the solenoid 82a to the non-excited state. This reduces the load on the solenoid 82a.

While the above embodiment describes an example in which the return-to-unlocked-state processing is performed after the unlocked-state continuation processing, the return-to-unlocked-state processing may be omitted. In the flowchart in FIG. 5, for example, the processing in step S14 and onward may be omitted, and end processing (see step S24) may be performed instead. In this case, the unlocked-state continuation processing period continues after the engine 24 has stopped with the mobile terminal 36 being lost. Then, after the first period of time has elapsed, the vehicle enters the normal OFF state.

Alternatively, the unlocked-state continuation processing may be omitted, and only the return-to-unlocked-state processing may be performed. In the flowchart in FIG. 5, for example, the processing in steps S6 to S12 may be omitted, and the processing in step S13 and onward may be performed instead. In this case, the return-to-unlocked-state processing period continues without intervention of the unlocked-state continuation processing period after the engine 24 has stopped with the mobile terminal 36 being lost. Then, after the second period of time has elapsed, the vehicle enters the normal OFF state.

When the engine 24 has stopped with the mobile terminal 36 being lost, the display screen 52a displays a screen that notifies the user of the loss of the mobile terminal 36. Thus, the user is able to notice the loss of the mobile terminal 36 by seeing the display screen 52a and to restart the engine 24.

Besides, the display screen 52a displays the restart guide screen different from the normal end screen when the mobile terminal 36 is lost. Thus, the user is able to easily notice the loss of the mobile terminal 36.

The restart guide screen largely displays information indicating the loss of the mobile terminal 36 in the area where the driving information is displayed during driving. Thus, the user is able to easily notice the loss of the mobile terminal 36.

The restart guide screen also displays the amount of time for which the engine 24 is restartable. Thus, the user is able to easily take appropriate measures, knowing how much time remains.

The restart guide screen also displays information about the restart method. Thus, the user is able to easily take appropriate measures, knowing the method for restart.

While the above embodiment describes an example in which the display 52 serves as a notification part that is capable of notifying the user of the loss of the mobile terminal 36, it is also possible to use, in addition to or instead of the display 52, the light-emitting and notification part 80 that is provided in the switch base 71, which is a portion surrounding the knob 75 of the operation part 74 serving as the first operating input device, in order to notify the user of the loss of the mobile terminal 36 (see FIG. 3). For example, the light-emitting and notification part 80 may implement a notification operation by flashing on and off at the time when the restart guide screen is displayed on the above-described display 52.

In this case, the light-emitting and notification part 80 performs the notification operation around the knob 75 of the operation part 74. Thus, the user is able to easily notice the loss of the mobile terminal 36 when operating the knob 75 to stop the engine 24.

In particular, the notification operation performed by the display 52 may be omitted and only the light-emitting and notification part 80 for the notification operation may be used. This brings about the advantage of reducing power consumption during a period that the engine 24 is stopped.

In addition to the notification operation using at least one of the display 52 and the light-emitting and notification part 80 described above, sounds such as a beeper or a klaxon horn may be used to notify the user of the loss of the mobile terminal 36.

While the above embodiment describes an example in which the operation part 74 including the rotatable knob 75 serves as the first operating input device, the first operating input device may be a push switch that receives a push operation from the user, or a slide switch that receives a slide operation from right to left and vice versa or from bottom to top and vice versa in a direction orthogonal to the plane operated by the user.

While the above embodiment describes an example in which the push detector 78 that receives the push and shift of the operation part 74 serves as the second operating input device, the rotation detector 76 may be configured to be capable of outputting a state in which the knob 75 is rotated from the rotational position indicating "LOCK" to a rotational position on the side opposite to the rotational position indicating "OFF" and may be configured to receive an authentication start operation or switch the solenoid actuator to the unlocked state when the knob 75 is rotated from this opposite rotational position to the rotational position indicating "LOCK." In this case, the rotation detector 76 functions as part of the first operating input device and functions as the shift operating input device.

As another alternative, the second operating input device may be provided separately from the first operating input device described above, and may be a push switch that receives a push operation from the user, or a slide switch that receives a slide operation from right to left and vice versa or from bottom to top and vice versa in a direction orthogonal to the plane operated by the user.

As described previously, the power engine may be other engines such as an electric motor. In this case, for example, steps S9, S10, S18, and S19 may be omitted from the flowchart in FIG. 5, and the power engine may be switched to a startable state when the knob 75 of the operation part 74 has been switched in step S8 or S17.

The configurations described in the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

As described above, the specification of the present invention includes each aspect of the invention described below.

A first aspect is directed to a wireless authentication device for a saddle-type vehicle and for performing authentication through wireless communication with a mobile terminal carried by a user. The wireless authentication device includes a first operating input device receives an operation for switching a power engine to a startable state by being shifted from a first position to a second position, a locking mechanism that switches between a locked state and an unlocked state, the locked state being a state that restricts shift of the first operating input device from the first position to the second position, and the unlocked state being a state that allows the first operating input device to shift from the first position to the second position, and a controller that determines whether a mobile terminal is lost through wireless communication with the mobile terminal, and if a power engine has stopped while the mobile terminal has been determined to have been lost, perform processing for keeping the locking mechanism in the unlocked state in a restartable period.

With this configuration, whether the mobile terminal is lost is determined through wireless communication with the mobile terminal, and if the power engine has stopped while the mobile terminal has been determined to have been lost, the locking mechanism remains in the unlocked state to allow the first operating input device to shift from the first position to the second position. Thus, even if the mobile terminal is lost, the user is able to drive the vehicle again by shifting the first operating device from the first position to the second position.

A second aspect is directed to the wireless authentication device for a saddle-type vehicle according to the first aspect. The wireless authentication device for a saddle-type vehicle further includes a second operating input device receives an operation from a user. The locking mechanism includes a locking part that moves between a locked position and an unlocked position, the locked position being a position at which, when the first operating input device is shifted from the first position to the second position, the locking part comes into contact with the first operating input device to restrict the shift of the first operating input device to the second position, and the unlocked position being a position at which the locking part allows the first operating input device to shift to the second position, a biasing part that biases the locking part toward the locked position, and a driving source that causes the locking part to move from the locked position to the unlocked position against a biasing force of the biasing part. The processing performed by the controller includes return-to-unlocked-state processing for keeping the driving source in a non-driving state during at least part of the restartable period, and if an operation to the second operating input device has been received, driving the driving source to move the locking part to the unlocked position against the biasing force of the biasing part and to switch the locking mechanism to the unlocked state.

With this configuration, the driving source is once switched to the non-driving state during at least part of the power-engine restartable period. Thus, there is no need to continue to energize the driving source for a long period of time. This minimizes the load on the driving source.

A third aspect is directed to the wireless authentication device for a saddle-type vehicle according to the second aspect. The second operating input device is a shift operating input device that receives an operation for shifting the first operating input device.

With this configuration, after the first operating input device has been shifted and this shift has been received by the shift operating input device, the user is able to easily start the power engine by shifting the first operating input device from the first position to the second position.

A fourth aspect is directed to the wireless authentication device for a saddle-type vehicle according to the second or third aspect. The controller, in a normal power-engine stopped state, performs processing for performing authentication through wireless communication with a mobile terminal upon receiving an operation to the second operating input device, and if the authentication has succeeded, switching the locking mechanism to the unlocked state.

With this configuration, even if the mobile terminal is lost, the user is able to restart the engine by the same operation as the operation performed in the normal engine stopped state.

A fifth aspect is directed to the wireless authentication device for a saddle-type vehicle according to any one of the second to fourth aspects. The processing performed by the controller includes unlocked-state continuation processing and the return-to-unlocked-state processing that is performed after the unlocked-state continuation processing, the unlocked-state continuation processing being processing for continuing to drive the driving source during an initial period of the restartable period.

With this configuration, in the early period after the power engine has stopped, the user is able to restart the power engine by simply operating the first operating input device without any switching operation. Besides, in the initial period of the power engine restartable period after the power engine has stopped, the driving source continues to be driven, and thereafter, the return-to-unlocked-state processing is performed to switch the driving source to the non-driving state. This reduces the load on the actuator.

A sixth aspect is directed to the wireless authentication device for a saddle-type vehicle according to any one of the first to fifth aspects. The wireless authentication device for a saddle-type vehicle further includes a notification part that notifies a user of the loss of the mobile terminal. The controller that determines whether the mobile terminal is lost through wireless communication with the mobile terminal, and if the power engine has stopped while the mobile terminal has been determined to have been lost, notifies a user of the loss of the mobile terminal via the notification part.

With this configuration, whether the mobile terminal is lost is determined through wireless communication with the mobile terminal, and if the power engine has stopped while the mobile terminal has been determined to have been lost, the loss of the mobile terminal is notified to the user via the notification part. Thus, the user is able to easily notice the loss of the mobile terminal and to restart the power engine.

A seventh aspect is directed to the wireless authentication device for a saddle-type vehicle according to the sixth aspect. The notification part includes a display that displays a screen that notifies a user of the loss of the mobile terminal.

With this configuration, the user is able to notice the loss of the mobile terminal by seeing the display and to restart the power engine.

An eighth aspect is directed to the wireless authentication device for a saddle-type vehicle according to the seventh aspect. The display displays a first screen when the power engine has stopped while the mobile terminal has been determined not to have been lost, and to display a second screen different from the first screen when the power engine has stopped while the mobile terminal has been determined to have been lost.

With this configuration, different screens are displayed on the display when the mobile terminal is lost and when the mobile terminal is not lost. Thus, the user is able to easily notice the loss of the mobile terminal.

A ninth aspect is directed to the wireless authentication device for a saddle-type vehicle according to the seventh or eighth aspect. The display, when the power engine has stopped while the mobile terminal has been determined to have been lost, displays a screen that displays information notifying a user of the loss of the mobile terminal, in an area where operation information is displayed during driving.

With this configuration, information that notifies the user of the loss of the mobile terminal is largely displayed by using the area where the operation information is displayed during driving. Thus, the user is able to easily notice the loss of the mobile terminal.

A tenth aspect is directed to the wireless authentication device for a saddle-type vehicle according to any one of the seventh to ninth aspects. The display, when the power engine has stopped while the mobile terminal has been determined to have been lost, displays a screen that displays at least one of an amount of time for which the power engine is restartable and information about a restart method.

With this configuration, the display panel displays at least one of the amount of time for which the power engine is restartable and information about a restart method. Thus, the user is able to easily take appropriate measures.

An eleventh aspect is directed to the wireless authentication device for a saddle-type vehicle according to any one of the sixth to tenth aspects. The notification part includes a notification display part that is provided in a portion surrounding the first operating input device.

With this configuration, the notification display part is provided around the first operating input device. Thus, the user is able to easily notice the loss of the mobile terminal when operating the first operating input device to stop the power engine.

What is claimed is:

1. A wireless authentication device for a saddle-type vehicle and for performing authentication through wireless communication with a mobile terminal carried by a user, the wireless authentication device comprising:
   a first operating input device that receives an operation for switching a power engine to a startable state by shifting from a first position to a second position;
   a locking mechanism that switches between a locked state and an unlocked state, wherein the locked state restricts the shifting of said first operating input device from said first position to said second position, and wherein the unlocked state allows the shifting of said first operating input device from said first position to said second position; and
   a controller that communicates wirelessly with the mobile terminal to authenticate the presence of the mobile terminal, and, if the power engine stops when the presence of the mobile terminal is not authenticated, performs processing for maintaining said locking mechanism in said unlocked state so that the power engine is restartable for a period of time.

2. The wireless authentication device for a saddle-type vehicle according to claim 1, further comprising a second operating input device that receives an operation from a user:
   wherein said locking mechanism includes
      a locking part that moves between a locked position and an unlocked position, wherein the locked position is a position at which, when said first operating input device shifts from said first position to said second position, said locking part comes into contact with said first operating input device to restrict the shifting of said first operating input device to said second position, and wherein the unlocked position is a position at which said locking part allows said first operating input device to shift to said second position;

a biasing part that biases said locking part toward said locked position, and a driving source that causes said locking part to move from said locked position to said unlocked position against a biasing force of said biasing part;

wherein said processing performed by said controller includes return-to-unlocked-state processing to maintain said driving source in a non-driving state during at least part of said period of time during which the power engine is restartable, and if the operation to said second operating input device has been received, driving said driving source to move said locking part to said unlocked position against the biasing force of said biasing part and to switch said locking mechanism to said unlocked state.

3. The wireless authentication device for a saddle-type vehicle according to claim 2, wherein said second operating input device is a shift operating input device that receives a push operation from an operating part, thereby switching the locking mechanism to an unlocked state so that the operation part is rotatable, whereby rotation of the operating part is received by said first operating input device to switch the power engine to the startable state.

4. The wireless authentication device for a saddle-type vehicle according to claim 2, wherein said controller, in a normal power engine-stopped state, performs authentication processing through wireless communication with the mobile terminal upon receiving the operation from the user to said second operating input device, and if the authentication processing determines that the mobile terminal is present, switches said locking mechanism to said unlocked state.

5. The wireless authentication device for a saddle-type vehicle according to claim 2, wherein said processing performed by said controller includes unlocked-state continuation processing, and said return-to-unlocked-state processing is performed after said unlocked-state continuation processing, wherein the unlocked-state continuation processing is processing for continuing to drive said driving source during an initial part of the period of time during which the power engine is restartable.

6. The wireless authentication device for a saddle-type vehicle according to claim 1, further comprising a notification part that notifies the user when the presence of the mobile terminal is not authenticated;

wherein said controller determines whether the mobile terminal is present through wireless communication with the mobile terminal, and if the power engine has stopped while the presence of the mobile terminal is not authenticated, notifies the user that the presence of the mobile terminal is not authenticated via said notification part.

7. The wireless authentication device for a saddle-type vehicle according to claim 6, wherein said notification part includes a display that displays a screen that notifies the user when the presence of the mobile terminal is not authenticated.

8. The wireless authentication device for a saddle-type vehicle according to claim 7, wherein said display displays a first screen when the power engine has stopped and the presence of the mobile terminal is authenticated, and displays a second screen, that is different from said first screen, when the power engine has stopped and the presence of the mobile terminal is not authenticated.

9. The wireless authentication device for a saddle-type vehicle according to claim 7, wherein when the power engine has stopped and the presence of the mobile terminal is not authenticated, said display displays a screen that shows information notifying the user that the presence of the mobile terminal is not authenticated in a display area where operation information is displayed during driving.

10. The wireless authentication device for a saddle-type vehicle according to claim 7, wherein when the power engine has stopped and the presence of the mobile terminal is not authenticated, said display displays a screen that shows at least one of the period of time during which the power engine is restartable and information about a restart method.

11. The wireless authentication device for a saddle-type vehicle according to claim 6, wherein said notification part includes a notification display part that is provided in a portion surrounding said first operating input device.

* * * * *